UNITED STATES PATENT OFFICE.

CARL J. RENZ, OF HUDSON, NEW YORK.

IMPROVEMENT IN METHODS OF RESTORING MOISTURE TO GRAPES.

Specification forming part of Letters Patent No. 218,401, dated August 12, 1879; application filed January 23, 1879.

*To all whom it may concern:*

Be it known that I, CARL J. RENZ, of the city of Hudson, in the county of Columbia and State of New York, have invented a new and Improved Process of Restoring Moisture to Grapes, of which the following is a specification.

This invention relates to restoring dried grapes to their original plumpness and bloom.

In the course of a series of experiments to find a method of restoring dried fruits I have discovered that if dried grapes be subjected for a suitable time to water heated to a proper degree, the fruit so treated loses its dried and shriveled appearance, and resumes not only its original plumpness, but the bloom on the skins, and the flavor of the fruit is improved, as there is less acidity and more sweetness than when the fruit is first separated from the vine.

In carrying out my invention I take bunches of dried and shriveled grapes, which have been kept since picking in a dry and airy room, remove all moldy and rotten grapes, and then immerse the remainder in water heated to from 138° to 145° Fahrenheit, allowing them to remain in the heated water from forty to sixty seconds, which will usually restore their original plumpness and bloom.

If it should be found after removal from the water that any of the grapes should not have swelled out to their usual size, a second dip for a few seconds will complete their restoration.

The main stems should be entirely covered by the hot water, as it toughens and strengthens them so that they do not readily break by handling.

By this process the shriveled and shrunken grapes are restored, giving them their natural plumpness, together with their original quality and flavor, and even the bloom that characterized them when picked from the vine; and not only this, but their sweetness is considerably improved by the change undergone by the pulp and saccharine matter in the drying and subsequent treatment with hot water.

This restoration is not evanescent, but the fruit can be kept in that condition for weeks, if desired, and the grapes adhere as perfectly to their stems as when first picked.

Grapes or other fruit designed to be subjected to this process should be stored, when picked, in a cool, dry room, secure from freezing, suspended on lines in preference to packing in boxes. If, by thus hanging in the air they shrivel and dry, as by December or January they usually will, because the saccharine matter has dried and become condensed, leaving the grapes in a shriveled form, it is no objection, as they are not usually decayed.

By the hot-water treatment above described the saccharine matter is dissolved and the grape restored to its original condition without injury to the skin, the pulp, or the quality of the grape.

I am aware that fruits of various kinds have been soaked in water, that both cut and uncut dried fruits have been stewed or boiled, and that grapes have been preserved in their usual plump condition by placing the ends of their main stems in water shortly after picking and keeping them there until wanted for use; but none of these methods are the equivalents of my process, because cold water will not produce the effect on dried and shrunken grapes that my process will, as it requires water of just the right degree of heat to dissolve the saccharine matter without injury to the grape; nor will boiling water accomplish what is desired, as it will injure the skins of the grapes and prevent their keeping, whereas grapes restored by my process will keep for a long time without injury.

What I claim as new is—

The process of restoring dried or shriveled grapes by immersing them from forty to sixty seconds in water heated from 138° to 145° Fahrenheit, substantially as described.

CARL J. RENZ.

Witnesses:
HENRY SHELDON,
JOHN LITTLEWOOD.